US012685422B1

(12) United States Patent
Jackson

(10) Patent No.: US 12,685,422 B1
(45) Date of Patent: Jul. 21, 2026

(54) ADJUSTABLE CLEANING WAND WITH ROTATABLE HANDLE

(71) Applicant: Craig A Jackson, Covington, WA (US)

(72) Inventor: Craig A Jackson, Covington, WA (US)

( * ) Notice: Subject to any disclaimer, the term of this patent is extended or adjusted under 35 U.S.C. 154(b) by 786 days.

(21) Appl. No.: 18/111,568

(22) Filed: Feb. 19, 2023

(51) Int. Cl.
*A47L 11/40* (2006.01)
*A47L 11/34* (2006.01)
*F16L 27/12* (2006.01)

(52) U.S. Cl.
CPC ........... *A47L 11/4075* (2013.01); *A47L 11/34* (2013.01); *A47L 11/4094* (2013.01); *F16L 27/12* (2013.01)

(58) Field of Classification Search
CPC .. A47L 11/4075; A47L 11/34; A47L 11/4094; A47L 9/32–9/327; F16L 27/12
See application file for complete search history.

(56) References Cited

U.S. PATENT DOCUMENTS

| | | | | |
|---|---|---|---|---|
| 977,380 | A | * | 11/1910 | Foster ..................... A47L 9/325 |
| | | | | 15/410 |
| 4,662,026 | A | * | 5/1987 | Sumerau ................... A47L 9/32 |
| | | | | 15/329 |
| 6,101,672 | A | * | 8/2000 | Conrad ................... A47L 9/325 |
| | | | | 15/410 |
| 2004/0211028 | A1 | * | 10/2004 | Shanor ................... A47L 9/325 |
| | | | | 15/410 |

* cited by examiner

*Primary Examiner* — Andrew A Horton
(74) *Attorney, Agent, or Firm* — Joseph Z. Ellsworth

(57) ABSTRACT

An adjustable carpet cleaning wand which has a rotating handle. The wand also has an axillary lower handle for holding the device while in a shortened state for cleaning furniture or stairs. The adjustment of the wand is made possible with an adjustment clamp that allows movement of the adjustment tube or fixes the adjustment tube in place.

20 Claims, 9 Drawing Sheets

ADJUSTABLE CLEANING WAND WITH ROTATABLE HANDLE

TECHNICAL FIELD

This invention relates to carpet cleaning devices, more specifically adjustable wands for extracting contaminates and stains from carpet.

BACKGROUND ART

Modern homes have carpets that provide insulation, sound reduction and comfort. These carpets are susceptible to staining and soil intrusion from the feet of inhabitants. Many companies have invented cleaning devices using suction to draw out dirt and soil. Other cleaning devices use wet cleaning wherein steam or detergent enriched water is sprayed on the carpet and immediately extracted by suction. These carpet cleaners have a wand that has sprayers near a nozzle end and a suction tube and are configured to be used while a person is standing. To prevent lower back injury, it is necessary to have wands of different lengths. Also, many carpet cleaners work long hours and can get sore hands and wrists from moving the wand back and forth along the carpet. There is a need in the art for a wand that is easily adjustable in length and has an ergonomic hand grip.

SUMMARY

It is therefore a benefit to the art to address the shortcomings of the prior art by introducing a novel solution to the known problems.

In one illustrative embodiment, a cleaning wand is provided for cleaning floors. A handle tube, an adjustment tube and a fixed tube are connected to a vacuum source and the fixed tube is attached to a wand head that provides the cleaning operation against the floor. A rotating handle is fixedly attached to the handle tube and is free to rotate about the axis of the handle tube and provides the wrist relief for the user.

In another illustrative embodiment, a carpet cleaning system is provided with a handle tube, an adjustment tube, a fixed tube and a vacuum source. The vacuum source is attached to the handle tube and draws suction through the wand head. A rotating handle is fixedly attached to the handle tube and is free to rotate about the axis of the handle tube and provides wrist relief for the user.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION OF THE PREFERRED EMBODIMENT

The different illustrative embodiments recognize and take into account different considerations. For example, the different illustrative embodiments recognize and take into account that in certain situations, currently available cleaning wands may be ergonomically unsuitable and cause soreness in a user's wrist or hand. In another situation a wand length may need to be adjusted to fit a user's height or to accommodate what surface being cleaned.

Figure 1:
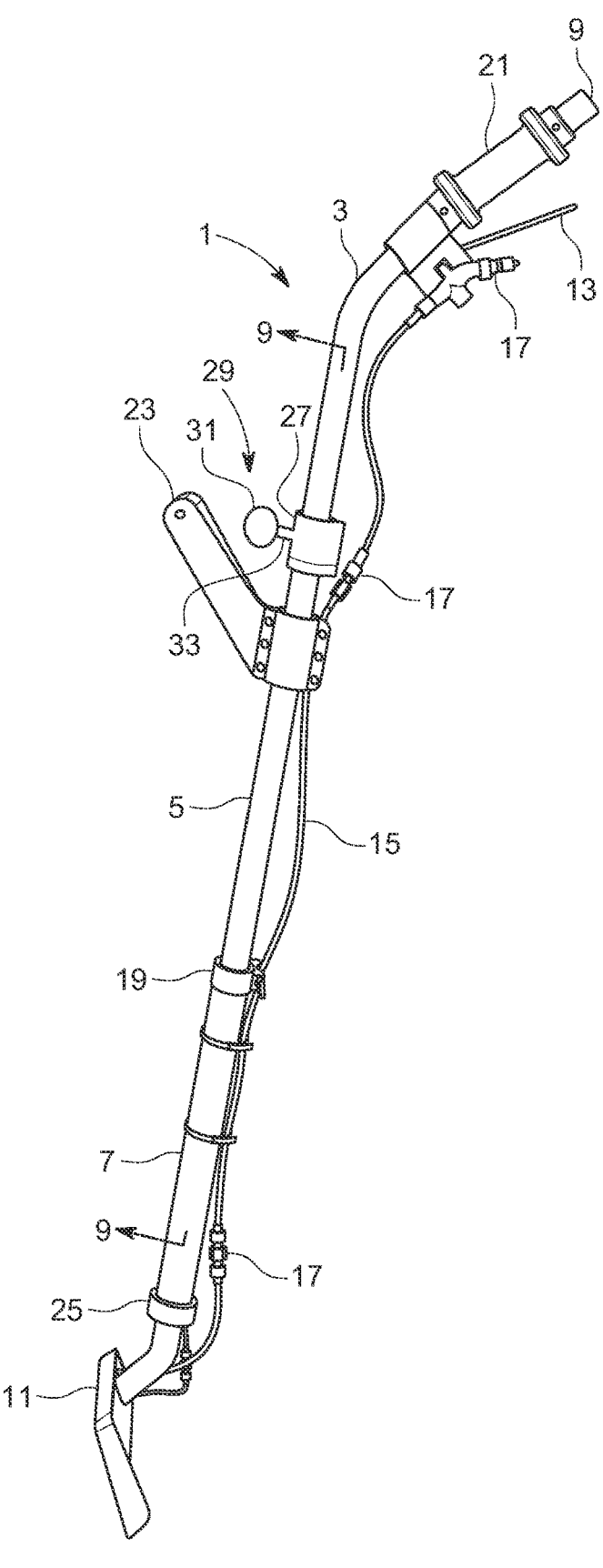
FIG. 1. Isometric view of an adjustable cleaning wand.

Referring to FIG. 1. A cleaning wand 1 may have three tube sections. A handle tube 3, an adjustment tube 5 and a fixed tube 7. The handle tube 3 has a hose end 9 that is configured to be connected to a vacuum source. The fixed tube 7 may be attached to a wand head 11 and provides fluid communication to the adjustment tube 5. A trigger 13 is fixedly attached to the handle tube 3 and directs the flow of steam through high pressure tubing 15. The high-pressure tubing 15 may have a plurality of high-pressure connectors 17 that connect to a steam source and break up the high-pressure tubing 15 to allow removal of sections of the cleaning wand tube such as the adjustment tube 5 and the fixed tube 7. An adjustment tube clamp 19 sits atop the fixed tube 7 and allows the adjustment tube 5 to be telescopically slid into the fixed tube 7 and fixed at a desired location to make the cleaning wand 1 the desired length.

A rotating handle 21 is fixedly attached to the handle tube 3 along the axis of the tube but is free to rotate about the axis of the handle tube 3. This free rotation relieves any stress on the hands and wrists of a user of the wand because no rotating stress can be reacted by the rotating handle 21. A lower handle 23 is preferably attached to the adjustable tube 5 or may be attached to the handle tube 3. The lower handle 23 may angle back or extend perpendicular to the tube axis. The lower handle 23 is tightly clamped to the wand and may be means for holding the high-pressure tube 15 in place.

Lower tube clamp 25 tightly secures a cleaning implement such as a wand head 11 to the fixed tube 7. Other cleaning implements may be a tile tool or a corner tool or a vacuum tool with a moving brush. Upper tube clamp 27 is fixedly attached to the handle tube 3 and is tightly secured to the adjustable tube 5. The upper tube clamp 27 is may also be secured to a cleaning implement such as a wand head 11 for cleaning stairs where a shorter wand is desired. When cleaning stairs with the adjustable tube 5 and the fixed tube 7 gone, there would be no lower handle for a user's second hand. Therefore, an auxiliary lower handle 29 may be attached to the handle tube 3. The auxiliary lower handle 29 may be spherical ball 31 attached to a spacer 33 and bolted through the upper tube clamp 27. The auxiliary lower handle 29 may be any knob that is low profile but allows good grip for a user. For example, a doorknob shape, a T-handle, or an ellipsoid.

Figure 2:
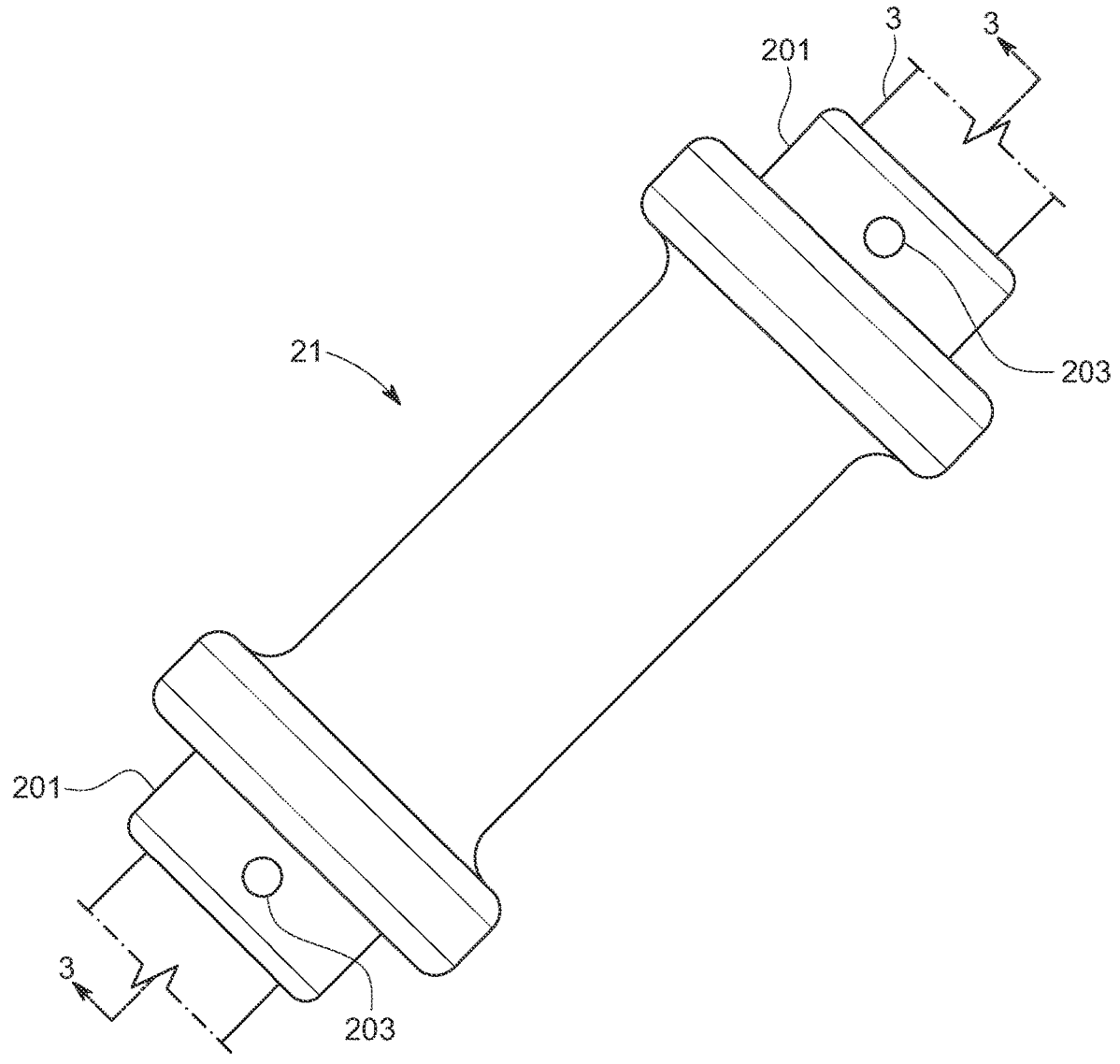
FIG. 2. Close up view of the hand grip of an adjustable cleaning wand.

FIG. 2 is a close of view of the rotating handle 21. The rotating handle 21 is kept from moving along the tube axis by a tube collar 201 on each end. The tube collar 201 may be secured in place by a set screw 203 that is tightened against the handle tube 3. The tube collar 201 preferably limits axial motion only and does not restrict rotation of the rotating handle 21.

Figure 3:
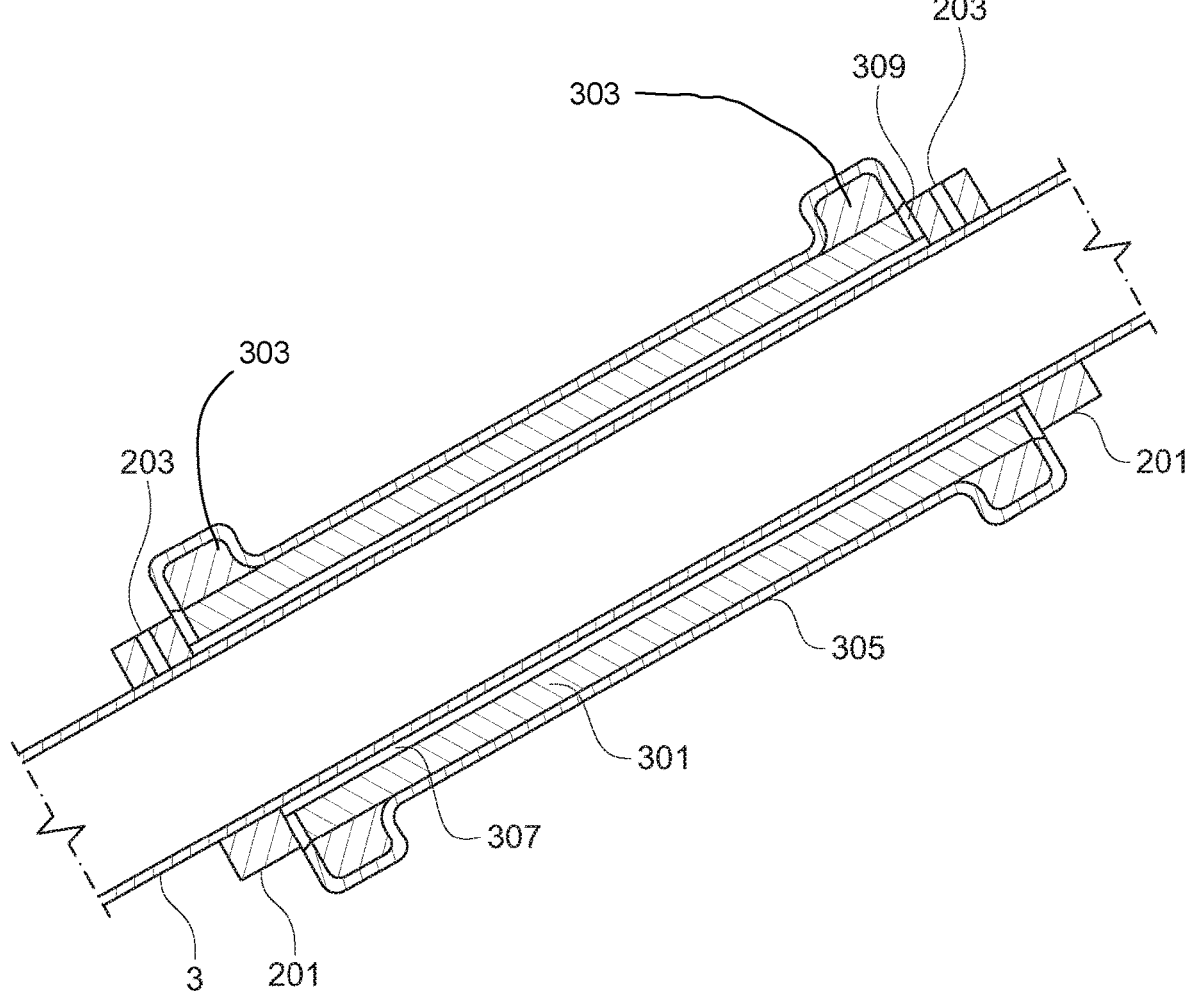
FIG. 3. Cut view of the hand grip of FIG. 2.

FIG. 3 is a cut view taken from FIG. 2 and shows the internal details of the rotating handle 21. The rotating handle 21 is held in place axially with two tube collars 201 with set screws 203 setting the collars in place on the tube handle 3. The rotating handle 21 comprises an inner tube 301 and a fillet tube 303 and a comfort grip 305. The inner tube is slightly larger in diameter than the handle tube 3 and forms a rotation gap 307 that allows the rotating handle 21 to rotate freely around the handle tube 3. An axial gap 309 is formed between the inner tube 301 and the tube collars 201. The axial gap 309 allows free rotation of the rotating handle 21 but doesn't allow movement in the axial direction as this would be undesirable. The fillet tube 303 provides a comfortable lip for the user's hand to prevent slipping off the handle during use. The comfort grip 305 covers the entire outer portion of the rotating handle 21 and provides a comfortable, waterproof, high grip covering.

Figure 4:
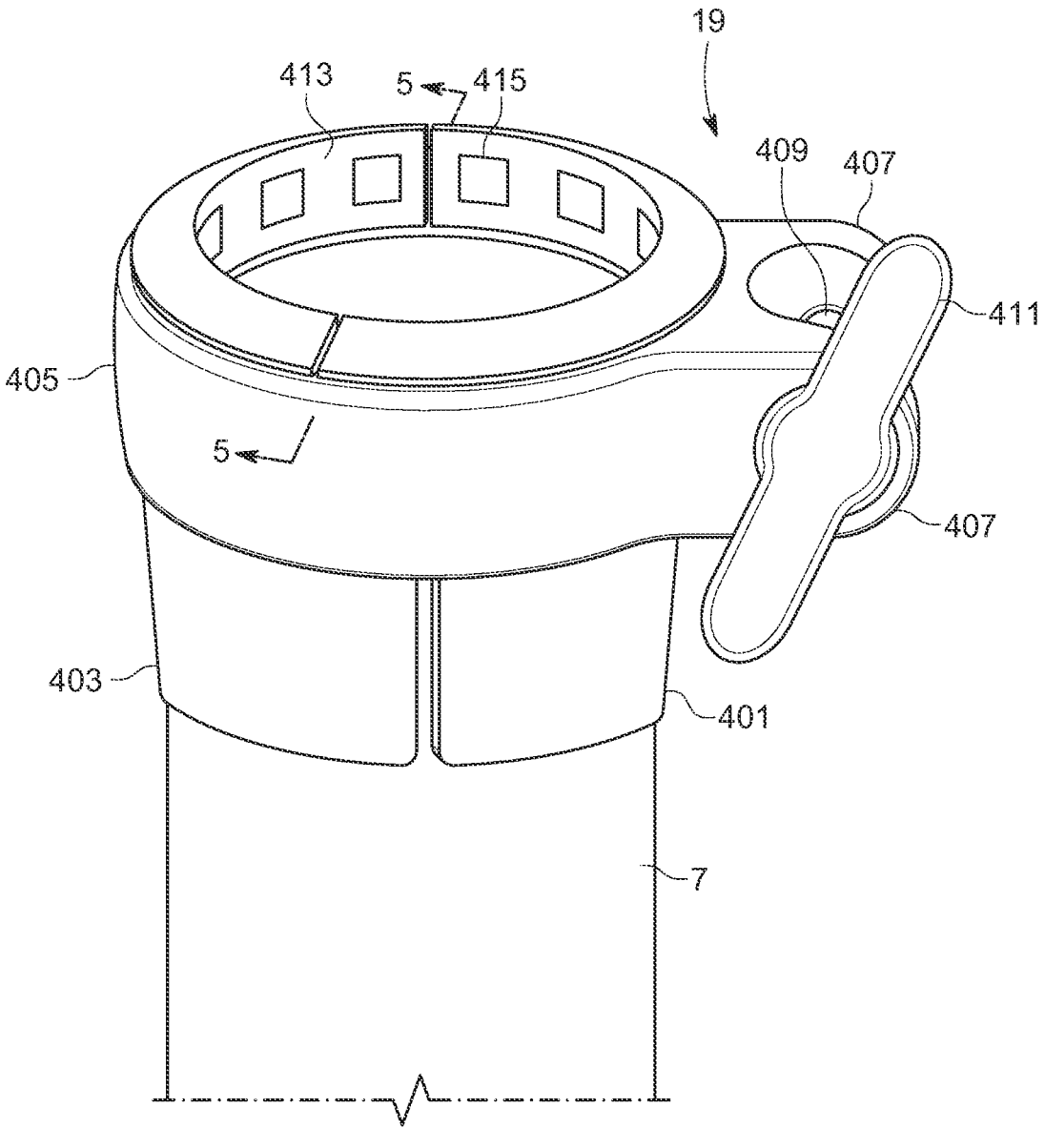
FIG. 4. Isometric detail view of an adjustment clamp.

FIG. 4 is a close-up view of the adjustment tube clamp 19 attached to the fixed tube 7 and allows the adjustment tube 5 to slidably adjust and then fix in a desired position. The desired position is a total wand length that best ergonomically or functionally fits the user as the user works a surface to be cleaned. The adjustment tube clamp 19 comprises a first clam shell clamp sleeve 401 and a second clam shell clamp sleeve 403. The clam shell clamp sleeves function to take up the space between the clam shell clamp ring 405 and the two different diameters in the fixed tube 7 and the adjustment tube 5. The clamshell clamp sleeves 401, 403 seal against the fixed tube 7 and protrude over the top of the fixed tube 7 to clamp against the adjustment tube 5. The clamshell clamp ring has two ears 407 that tighten the clamshell ring when a clamshell bolt 409 is twisted using a wing nut 411. The clamshell clamp ring 405 could also be tightened using a wing screw 411 instead of the clam shell bolt 409. The tightening of the clam shell ring 405 tightens the sleeve seal 413 against the adjustment tube 5 and seals out atmospheric pressure and provide friction to prevent movement between the adjustment tube and the fixed tube 7. The sleeve seal 413 is a flat surface that seals flush against the smooth tube walls. The sleeve seal 413 also has suction cups 415 the provide extra force to resist relative movement between the adjustment tube 5 and the fixed tube 7. The suction cups 415 may be round, square, rectangular, or triangular but optimally they are rectangular.

Figure 5:
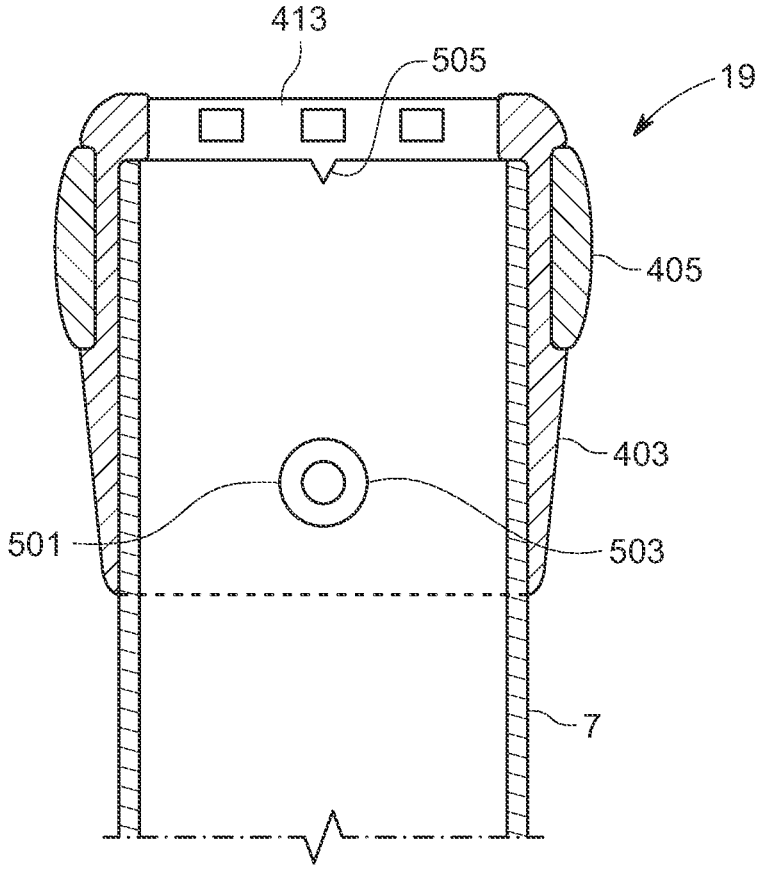
FIG. 5. Cut view of the adjustment clamp of FIG. 4.

FIG. 5 is a cut view taken from FIG. 4 and shows the adjustment tube clamp 19 and how it is aligned to the fixed tube. Second clamshell sleeve 403 has an alignment nipple that fits into a fixed tube aperture 503 in the fixed tube 7. The nipple 501 prevents the second clamshell sleeve 403 from rotating about the fixed tube 7. The fixed tube 7 may have a notch 505 that is used to align the clamshell sleeve so the nipple 501 fits through the aperture 503.

Figure 6:
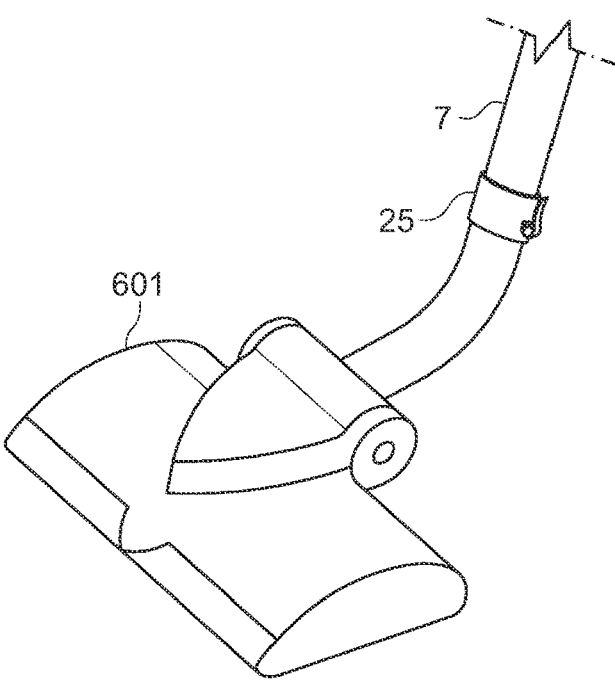
FIG. 6. Perspective view of the lower end of the adjustable wand with a vacuum attachment.

FIG. 6 is a perspective view of the wand having a vacuum attachment 601 installed in the lower tube clamp 25. The wand fixed tube 7 is in fluid communication with the vacuum attachment 601 and provides suction. The vacuum attachment 601 may have a brush that spins and aids in cleaning a surface. The brush may be electrically powered or may us the high air flow from the suction to move an impeller and thereby turn the brush.

Figure 7:
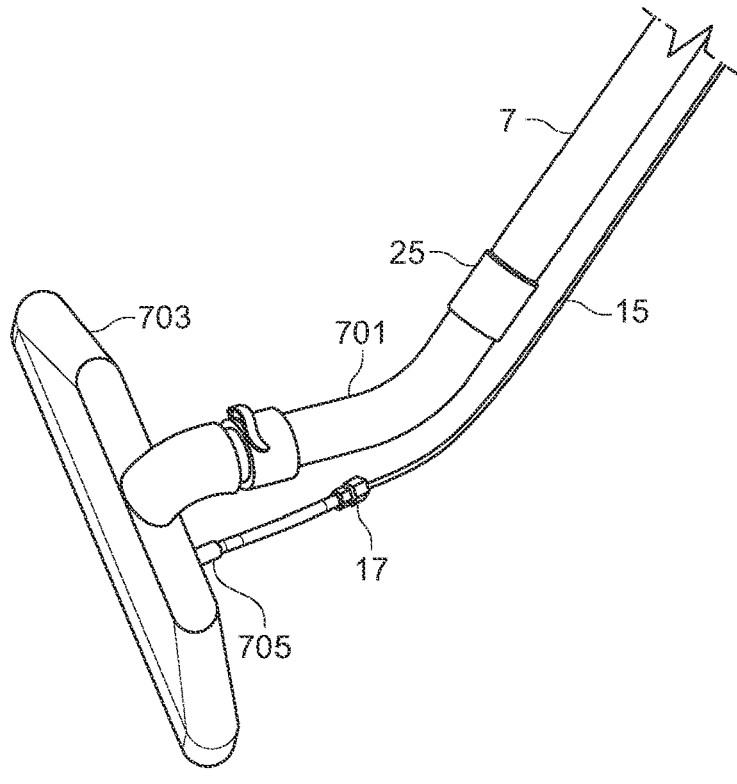
FIG. 7. Perspective view of the lower end of the adjustable wand with a hard surface cleaner attachment.

FIG. 7 is a perspective view of the wand having a tile or hard surface cleaner. The fixed tube 7 is attached to a lower tube clamp 25 which is in turn connected to a curved neck 701. The curved neck 701 adapts the hard surface cleaner head 703 to the ideal angle of the fixed tube 7. The hard surface cleaner head 703 has a high-pressure spray port 705 which injects high pressure water or steam directly into the cleaner head. This system cleans stains and immediately removes the fluid.

Figure 8:
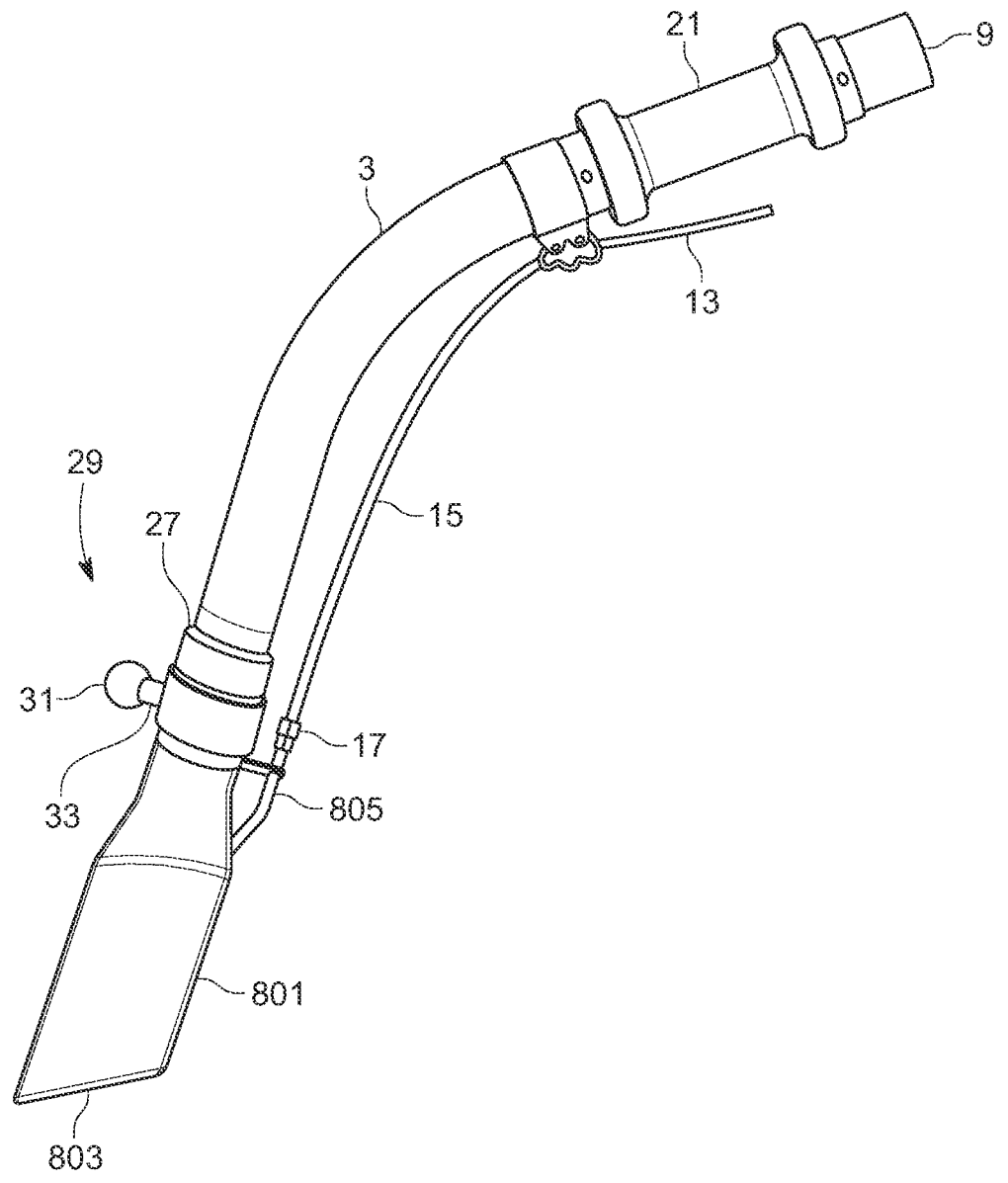
FIG. 8. Side view of the adjustable wand handle only attached to a crevice tool.

FIG. 8 is a perspective view of the wand with a crevice tool attached. The wand can be shortened to include only the handle tube 3 and the crevice tool head 801 attached to the upper tube clamp 27. The crevice tool has an ovoid opening 803 which may be at an angle relative to the tube centerline, to properly clean when the handle tube 3 is held comfortably. A high-pressure spray port 805 injects steam or high temperature water directly into the ovoid opening 803. The wand is shortened so that the user can clean the crevices and corners in stairs. A lower auxiliary handle 29 is included for the user to hold while cleaning stairs or while kneeling.

Figure 9:
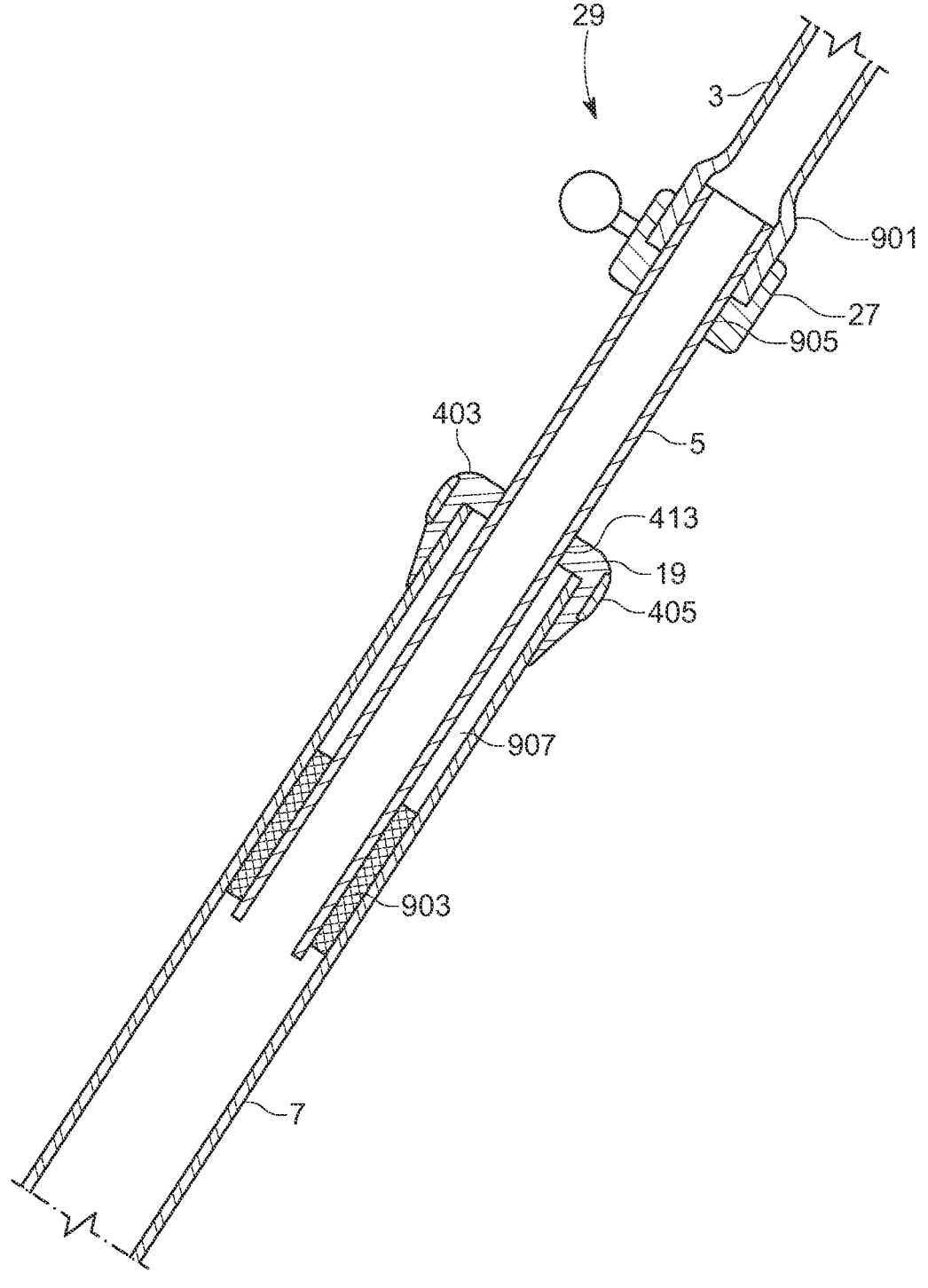
FIG. 9. Cut view taken from FIG. 1 showing the relative tube diameters and connections.

FIG. 9 is a cut view taken from FIG. 1 to show the relative diameter and of the tubes making up the adjustable wand. The handle tube 3 may be made from the same diameter tubing as the adjustment tube 5 if the handle tube 3 has a flared end 901 to fit over the adjustment tube 5. The upper tube clamp 27 may further couple the handle tube 3 and the adjustment tube 5 by being bonded to the handle tube 3 and then clamped to the adjustment tube 5 at a necked down portion 905 of the upper tube clamp 27. The lower tube 7 may be of a larger diameter than the adjustment tube 5 to allow free slidable movement of the adjustment tube 5 within the lower tube 7. A tube stopper 903 is coupled to the adjustment tube 5 and prevents it from exiting the lower tube 7 because it is too large in diameter to move past the sleeve seal 413. Also, the tube stopper 903 takes up the space 907 between the adjustment tube 5 and lower tube 7 and prevents the tubes from moving relative to one another except axially or in other words, prevents slop. The tube stopper 903 is preferably made from Teflon or nylon and slides lubriciously with in the lower tube 7 but is substantially the same diameter as the inner diameter of the lower tube for a nice firm feel in the joint.

Figure 10:
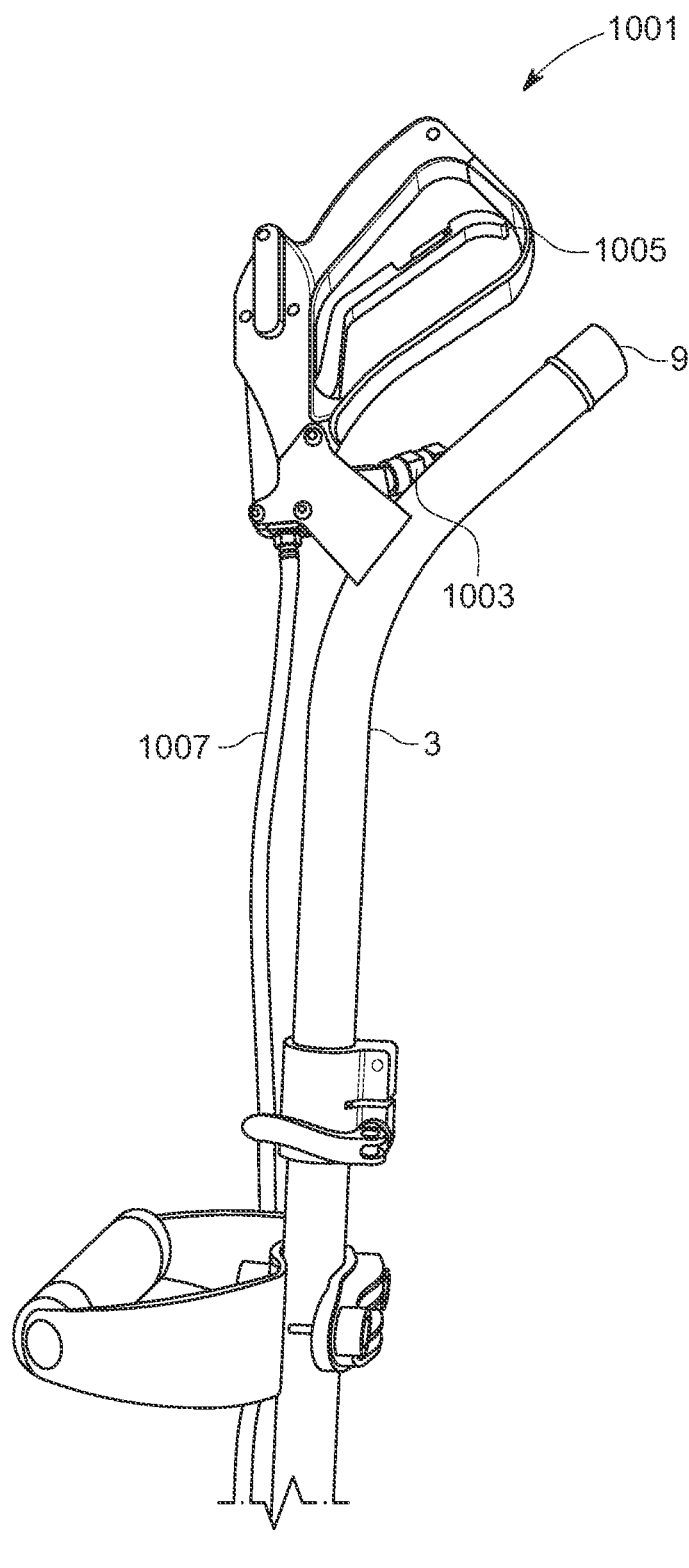
FIG. 10. Side view of the handle of the adjustable wand having a high-pressure handle attached.

FIG. 10 is a partial side view of the handle tube 3 in an alternate configuration. In some instances, the cleaning power of the detergent and high temperature of the spray is not cleaning a surface. Higher pressures are needed to clean the surface like a pressure washer between 1000-4000 psi. In this configuration a high-pressure handle 1001 is attached to the handle tube 3. A source of high-pressure water is attached to the high-pressure coupler 1003 and when the high-pressure trigger 1005 is pulled, then high pressure water or steam is sent through the high-pressure line 1007. A suction source is connected to hose end 9 and it sucks up the water that was sprayed onto a surface from the high-pressure line 1007. This embodiment allows pressure washing surfaces such as tile in an indoor environment without making a large mess.

In an illustrative embodiment, A cleaning wand 1 may comprise, a handle tube 3, an adjustment tube 5 and a fixed tube 7, wherein the handle tube 3 is configured to be connected to a vacuum source. The fixed tube 7 is configured to be attached to a wand head 11 on one end, and a rotating handle 21 is fixedly attached to the handle tube 3 and is free to rotate about the axis of the handle tube 3 on the other end. At least one tube collar 201 is attached to the handle tube 3 and is configured to prevent the rotating handle 21 from moving along the tube axis and may be secured in place by a set screw 203 that is tightened against the handle tube 3. The tube collar 201 limits axial motion of the rotating handle 21 only and does not restrict rotation of the rotating handle 21. This is partially because the inner tube 301 within the rotating handle 21 has an inner diameter larger than the handle tube outer diameter and forms a gap. A fillet tube 303 may be positioned on each end of the inner tube 301, and a comfort grip 305 may cover the outer portion of the inner tube 301 and the fillet tube 303. The fillet tube 303 and comfort grip 305 are configured to prevent a user's hand slipping off the rotating handle 21 during use. The fillet tube 303 provides a lip that mechanically (due to larger diameter) prevents a user's hand from slipping.

A lower handle 23 is provided for the user's second hand and may be clamped to the cleaning wand 1 and may hold a high-pressure tube in place. An adjustment tube clamp 19 may be coupled to the fixed tube 7 and allows the adjustment tube 5 to telescopically slide into the fixed tube 7 and be fixed at a desired position. First and second clam shell clamp sleeves 401, 403 are configured to take up the space between a clam shell clamp ring 405 and the different diameters in the fixed tube 7 and the adjustment tube 5 and may seal against the fixed tube 7 and protrude over the fixed tube 7 to clamp against the adjustment tube 5. The clamshell clamp ring may comprise two ears 407 that are configured to shrink the clamshell ring when a clamshell bolt 409 or wing screw are tightened. Shrinking the clam shell ring compresses a sleeve seal 413 against the adjustment tube 5 and prevents movement between the adjustment tube 5 and the fixed tube 7. The sleeve seal 413 is a flat surface and may have integral suction cups 415 to provide additional force to resist relative movement between the adjustment tube 5 and the fixed tube 7. The second clamshell sleeve may have an alignment nipple 501 that fits into a fixed tube aperture 503. This alignment nipple 501 locates the clamshell sleeve to the fixed tube 7 and prevent rotation relative to the fixed tube 7. The fixed tube 7 may have a notch 505 in the fixed tube to align the second clamshell sleeve relative to the fixed tube 7.

In a further illustrative embodiment, an upper tube clamp fixedly attached to the handle tube 3, may be secured to a cleaning implement and an auxiliary lower handle 29 may be attached to the handle tube 3 to allow use of the cleaning wand 1 without the fixed tube 7 and adjustment tube 5. The auxiliary lower handle 29 may comprise a spherical ball 31 and spacer 33 coupled to the upper tube clamp or the handle tube 3.

In a further illustrative embodiment there is provided, a carpet cleaning system having, a handle tube 3, an adjustment tube 5, a fixed tube 7 and a vacuum source. The vacuum source is attached to the handle tube 3 and is configured to draw suction through a wand head 11 attached to the fixed tube 7. A rotating handle 21 is fixedly attached to the handle tube 3 and is free to rotate about the axis of the handle tube 3. An adjustment tube clamp 19 is coupled to the fixed tube 7 and allows the adjustment tube 5 to telescopically slide into the fixed tube 7 and be fixed at a desired position. A first clam shell clamp sleeve 401 and a second clam shell clamp sleeve 403 may take up the space between a clam shell clamp ring 405 and the different diameters in the fixed tube 7 and the adjustment tube 5. A sleeve seal 413 is a flat surface and may have suction cups 415 that provide additional force to resist relative movement between the adjustment tube 5 and the fixed tube 7. The second clamshell sleeve may also an alignment nipple 501 that fits into a fixed tube aperture 503 to prevent the second clamshell sleeve from rotating relative to the fixed tube 7. The upper tube clamp may be fixedly attached to the handle tube 3 and is secured to a cleaning implement. An auxiliary lower handle 29 may be attached to the handle tube 3 to allow use of the cleaning wand 1 without the fixed tube 7 and adjustment tube 5. The auxiliary lower handle 29 may be a spherical ball 31 and a spacer 33 coupled to the upper tube clamp or the handle tube 3.

I claim:

1. A cleaning wand comprising:
a handle tube, an adjustment tube and a fixed tube,
the handle tube is configured to be connected to a vacuum source,
the fixed tube is configured to be attached to a wand head,
a rotating handle is fixedly attached to the handle tube and is free to rotate about an axis of the handle tube and,
an adjustment tube clamp coupled to the fixed tube,
wherein the adjustment clamp allows the adjustment tube to telescopically slide into the fixed tube and be fixed at a desired position.

2. The cleaning wand of claim 1 further comprising:
at least one tube collar configured to prevent the rotating handle from moving along the tube axis.

3. The cleaning wand of claim 2 wherein,
the at least one tube collar is secured in place by a set screw that is tightened against the handle tube.

4. The cleaning wand of claim 2 wherein,
the at least one tube collar limits axial motion of the rotating handle only and does not restrict rotation of the rotating handle.

5. The cleaning wand of claim 1 further comprising:
an inner tube having an inner diameter larger in diameter than a handle tube outer diameter and forming a gap.

6. The cleaning wand of claim 1 further comprising:
a fillet tube positioned on each end of the inner tube, and
a comfort grip covering an outer portion of the inner tube and the fillet tube and wherein the fillet tube and comfort grip are configured to prevent a user's hand slipping off the rotating handle during use.

7. The cleaning wand of claim 1 further comprising:
a lower handle clamped to the cleaning wand,
the lower handle configured to hold a high-pressure tube in place.

8. The cleaning wand of claim 1 further comprising:
a first clam shell clamp sleeve and a second clam shell clamp sleeve wherein,
the first and second clam shell clamp sleeves are configured to take up a space between a clam shell clamp ring and the different diameters in the fixed tube and the adjustment tube.

9. The cleaning wand of claim 8 wherein,
the first and second clamshell clamp sleeves seal against the fixed tube and protrude over the fixed tube to clamp against the adjustment tube.

10. The cleaning wand of claim 8 wherein,
the clamshell clamp ring comprises two ears that are configured to shrink the clamshell ring when a clamshell bolt or wing screw are tightened wherein,
shrinking the clam shell ring compresses a sleeve seal against the adjustment tube and prevents movement between the adjustment tube and the fixed tube.

11. The cleaning wand of claim 10 wherein,
the sleeve seal is a flat surface further comprising,
suction cups configured to provide additional force to resist relative movement between the adjustment tube and the fixed tube.

12. The cleaning wand of claim 8 wherein,
the second clamshell sleeve comprises an alignment nipple wherein,
the alignment nipple is configured to fits into a fixed tube aperture wherein, the alignment nipple is further configured to prevent the second clamshell sleeve from rotating relative to the fixed tube.

13. The cleaning wand of claim 12 wherein, the fixed tube further comprises a notch wherein, the notch is configured to align the second clamshell sleeve relative to the fixed tube allowing the alignment nipple to enter the fixed tube aperture.

14. The cleaning wand of claim 1 further comprising:

an upper tube clamp fixedly attached to the handle tube, wherein the upper tube clamp is configured to be secured to a cleaning implement, wherein an auxiliary lower handle is attached to the handle tube to allow use of the cleaning wand without the fixed tube and adjustment tube.

15. The cleaning wand of claim 14 wherein, the auxiliary lower handle comprises, a spherical ball, and a spacer, wherein the spherical ball and spacer are coupled to the upper tube clamp or the handle tube.

16. A carpet cleaning system comprising, a handle tube, an adjustment tube, a fixed tube and a vacuum source, the vacuum source is attached to the handle tube and is configured to draw suction through a wand head attached to the fixed tube, a rotating handle is fixedly attached to the handle tube and is free to rotate about an axis of the handle tube and, an adjustment tube clamp coupled to the fixed tube, wherein the adjustment clamp allows the adjustment tube to telescopically slide into the fixed tube and be fixed at a desired position wherein, the adjustment clamp further comprises, a first clam shell clamp sleeve and a second clam shell clamp sleeve wherein, the first and second clam shell clamp sleeves are configured to take up a space between a clam shell clamp ring and different diameters in the fixed tube and the adjustment tube.

17. The carpet cleaning system of claim 16 further comprising, a sleeve seal wherein, the sleeve seal is a flat surface further comprising, suction cups configured to provide additional force to resist relative movement between the adjustment tube and the fixed tube wherein, the second clamshell sleeve comprises an alignment nipple wherein, the alignment nipple is configured to fits into a fixed tube aperture wherein, the alignment nipple is further configured to prevent the second clamshell sleeve from rotating relative to the fixed tube.

18. The carpet cleaning system of claim 16 further comprising, an upper tube clamp fixedly attached to the handle tube, wherein the upper tube clamp is configured to be secured to a cleaning implement, wherein an auxiliary lower handle is attached to the handle tube to allow use of the cleaning wand without the fixed tube and adjustment tube, wherein the auxiliary lower handle comprises, a spherical ball, and wherein the spherical ball is coupled to the upper tube clamp or the handle tube.

19. A cleaning wand comprising:

a handle tube, an adjustment tube and a fixed tube, the handle tube is configured to be connected to a vacuum source, the fixed tube is configured to be attached to a wand head, a rotating handle is fixedly attached to the handle tube and is free to rotate about an axis of the handle tube and, an upper tube clamp fixedly attached to the handle tube, wherein the upper tube clamp is configured to be secured to a cleaning implement, wherein an auxiliary lower handle is attached to the handle tube to allow use of the cleaning wand without the fixed tube and adjustment tube.

20. The cleaning wand of claim 19 wherein, the auxiliary lower handle comprises, a spherical ball and, a spacer, wherein the spherical ball and spacer are coupled to the upper tube clamp or the handle tube.

* * * * *